(12) United States Patent
Koepfer

(10) Patent No.: US 9,933,689 B2
(45) Date of Patent: Apr. 3, 2018

(54) TILT MODULE SUBASSEMBLY AND OPTICAL IMAGE STABILIZER COMPRISING IT

(71) Applicant: ACTUATOR SOLUTIONS GMBH, Gunzenhausen (DE)

(72) Inventor: Markus Koepfer, Stoedtlen-Regelsweiler (DE)

(73) Assignee: ACTUATOR SOLUTIONS GMBH, Gunzenhausen (DE)

( * ) Notice: Subject to any disclaimer, the term of this patent is extended or adjusted under 35 U.S.C. 154(b) by 0 days.

(21) Appl. No.: 15/558,481

(22) PCT Filed: May 4, 2016

(86) PCT No.: PCT/IB2016/052535
§ 371 (c)(1),
(2) Date: Sep. 14, 2017

(87) PCT Pub. No.: WO2016/178152
PCT Pub. Date: Nov. 10, 2016

(65) Prior Publication Data
US 2018/0052381 A1 Feb. 22, 2018

(30) Foreign Application Priority Data
May 5, 2015 (IT) .............................. MI2015A0635

(51) Int. Cl.
*G03B 5/00* (2006.01)
(52) U.S. Cl.
CPC ........ *G03B 5/00* (2013.01); *G03B 2205/0023* (2013.01); *G03B 2205/0076* (2013.01)

(58) Field of Classification Search
CPC ... H05K 2201/0308; H01H 2061/0115; H01H 2085/0004; G03B 2205/0076; G03B 2205/0023; G05B 2219/41342
See application file for complete search history.

(56) References Cited

U.S. PATENT DOCUMENTS

| 2006/0272328 | A1 | 12/2006 | Hara et al. |
| 2014/0028906 | A1 | 1/2014 | Chen |
| 2015/0322929 | A1* | 11/2015 | Morikawa ................ G02B 7/08 |
| | | | 348/335 |

FOREIGN PATENT DOCUMENTS

| EP | 2615951 B1 | 12/2013 |
| EP | 2813877 A1 | 12/2014 |
| JP | 2008/020813 A | 1/2008 |
| WO | 2007113478 A1 | 10/2007 |
| WO | 2013175197 A1 | 11/2013 |

(Continued)

OTHER PUBLICATIONS

International Search Report and Written Opinion for PCT/IB2016/052535 filed May 4, 2016 on behalf of Actuator Solutions GmbH, dated Jul. 13, 2016. 11 pages.

(Continued)

*Primary Examiner* — Nelson D. Hernández Hernández
(74) *Attorney, Agent, or Firm* — Steinfl + Bruno LLP

(57) ABSTRACT

A tilt module subassembly comprising a cage essentially made of elastic material and shape memory alloy wires. An optical positioning system for microstructures using the tilt module subassembly is also described. The optical positioning system for microstructures is an optical image stabilizer.

21 Claims, 6 Drawing Sheets

(56) References Cited

FOREIGN PATENT DOCUMENTS

Figure 1:
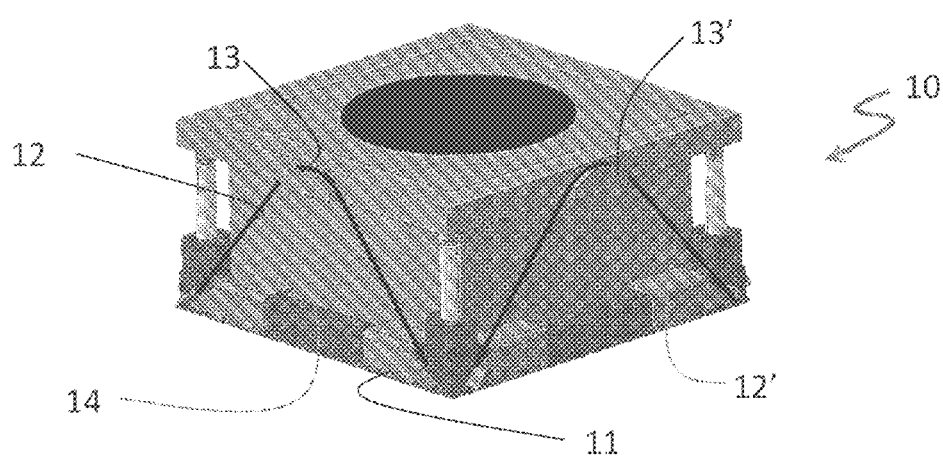

WO   2014057423  A2   4/2014
WO   2014128599  A1   8/2014

OTHER PUBLICATIONS

International Preliminary Report on Patentability for PCT/IB2016/052535 filed May 4, 2016 on behalf of Actuator Solutions GmbH, dated May 15, 2017. 9 pages.

* cited by examiner

TILT MODULE SUBASSEMBLY AND OPTICAL IMAGE STABILIZER COMPRISING IT

CROSS-REFERENCE TO RELATED APPLICATIONS

The present application is the U.S. national stage of International Patent Application PCT/IB2016/052535 filed on May 4, 2016 which, in turn, claims priority to Italian application MI2015A000635 filed on May 5, 2015.

Actuators based on Shape Memory Alloy (SMA) wires are becoming increasingly adopted due to the intrinsic advantages associated with this technology, in particular their capability to replace micro-motors offers advantages in terms of encumbrance, reliability, power consumption.

Some of the recent examples of SMA-based actuators are in valves for liquid mixers for vending machines, such as described in the European Patent EP 2615951, in anti-glare rear view mirrors, such as described in the international patent application WO 2014057423, and even in sails control systems, such as described in the international patent application WO 2014128599.

The above are just examples of the versatility and possibilities of SMA-based actuators. One particularly interesting application field is tilt modules, for examples to be used in an Optical Image Stabilizer for camera phones, such as described in the international patent application WO 2013175197 disclosing the use of a plurality of SMA wires working opposite to each other in order to achieve the tilt control.

A solution using a couple of SMA wires is described in US patent application 2006/0272328, in this case there is also disclosed the use of an elastic element providing the return force for the SMA wire, such elastic element being an interface between the rigid case and an image pickup unit whose tilt is controlled by two opposed shape memory alloy wires.

Use of SMA wires is also described in European patent application 2813877, showing a cage made up of a base plate and a driven plate formed of a resin-molding product and held by a support member so as to be in parallel with each other, said support member being made using a suspension wire having a thickness of about 80 μm to about 100 μm so as to be deformed by a driving member made using a linear SMA wire. Such document also teaches the importance of incorporating rigid elements as constitutional features of the structure, more specifically the use of fixing members, made using SUS (stainless) steel or copper-based metal material having a Young modulus of about 50 GPa to 250 GPa, to mechanically fix the SMA wire to the base plate.

The above solutions suffer from a major drawback that resides in the very same SMA property used for actuation, i.e. their capability to contract when heated but their high resistance to be further elongated. This implies that in order to achieve tilt, in normal conditions, the SMA wires shall be partially actuated at a different degree, requiring a higher power consumption and the need of a careful and complicated balance as well as a premature wear of the system.

Purpose of the present invention is to provide a tilt module capable of overcoming the problems and drawbacks still present in the known art, with particular reference to tilting systems achieving control by means of opposed SMA wires, and in a first aspect thereof consists in a tilt module subassembly comprising a cage consisting essentially of elastic material and a plurality of shape memory alloy wires, wherein said elastic material has a Young modulus comprised between 13000 and 16000 MPa, preferably between 14000 and 15000 MPa.

The expression "consisting essentially of elastic material" means that the cage may have some appendixes, such as connecting means, that are made with a rigid material, but for the purpose of the present invention at least 90% wt. of the cage material are elastic materials fulfilling the Young modulus requirement above expressed.

Figure 2:
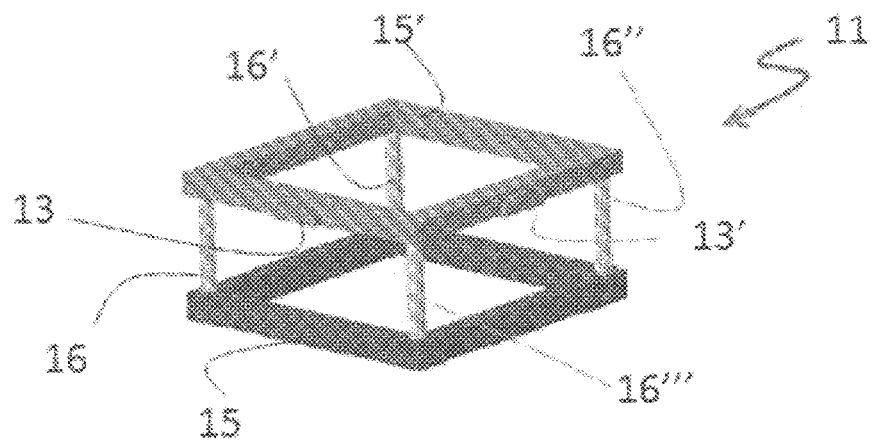
Figure 3:
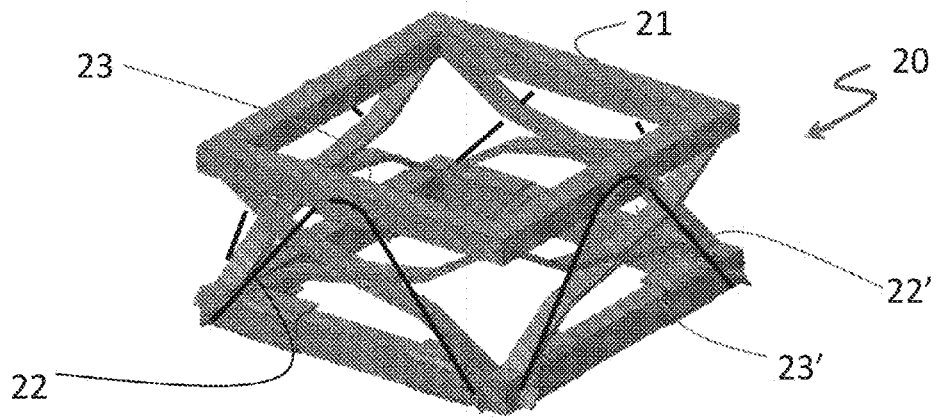
Figure 4:
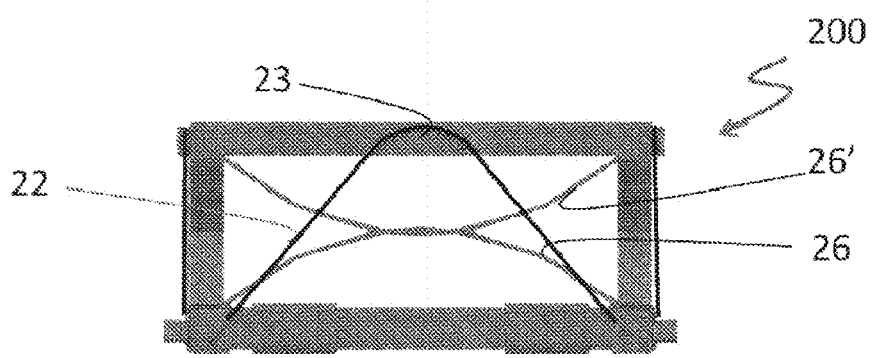
Figure 5A:
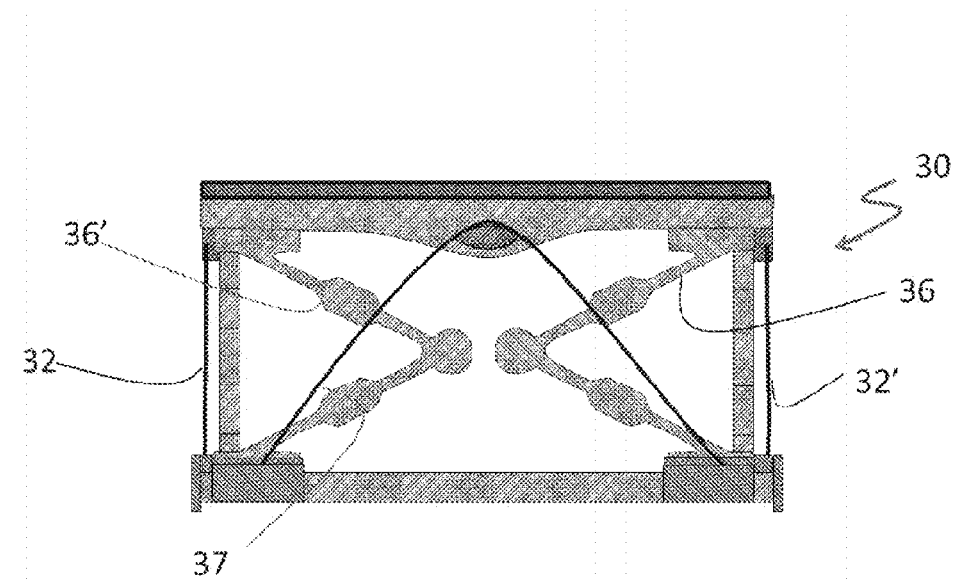
Figure 5B:
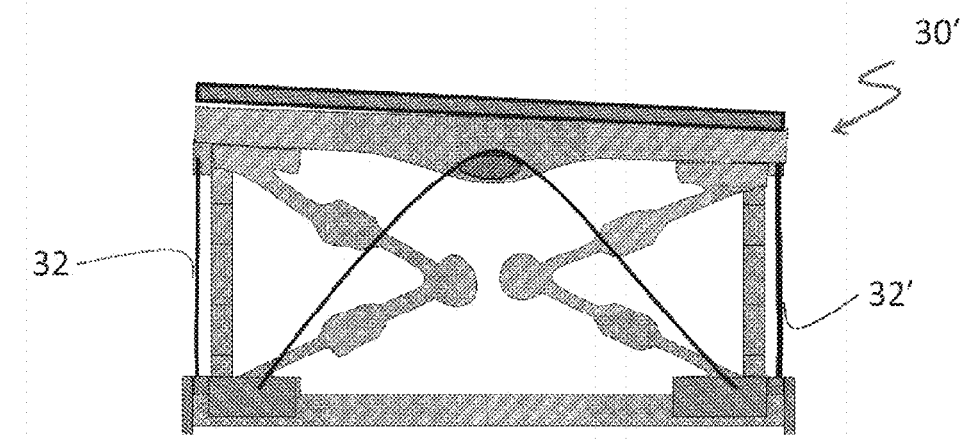
Figures 6A, 6B:
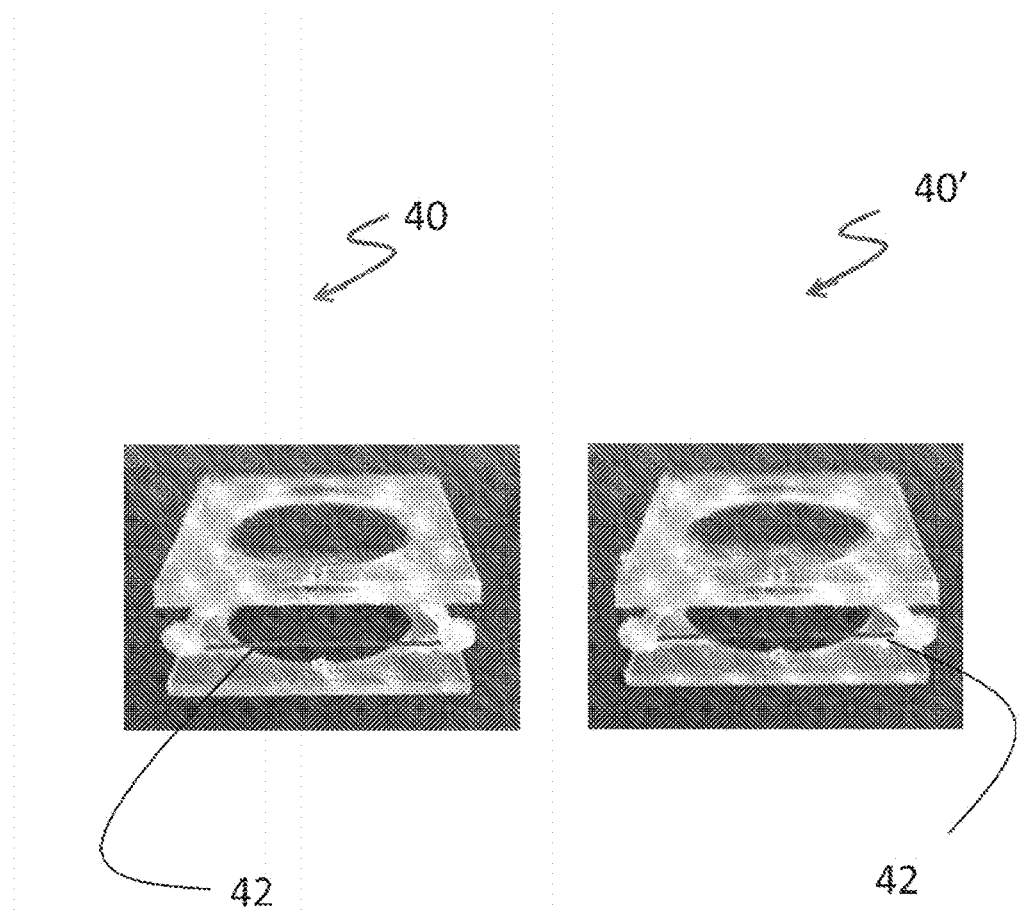
Figure 7:
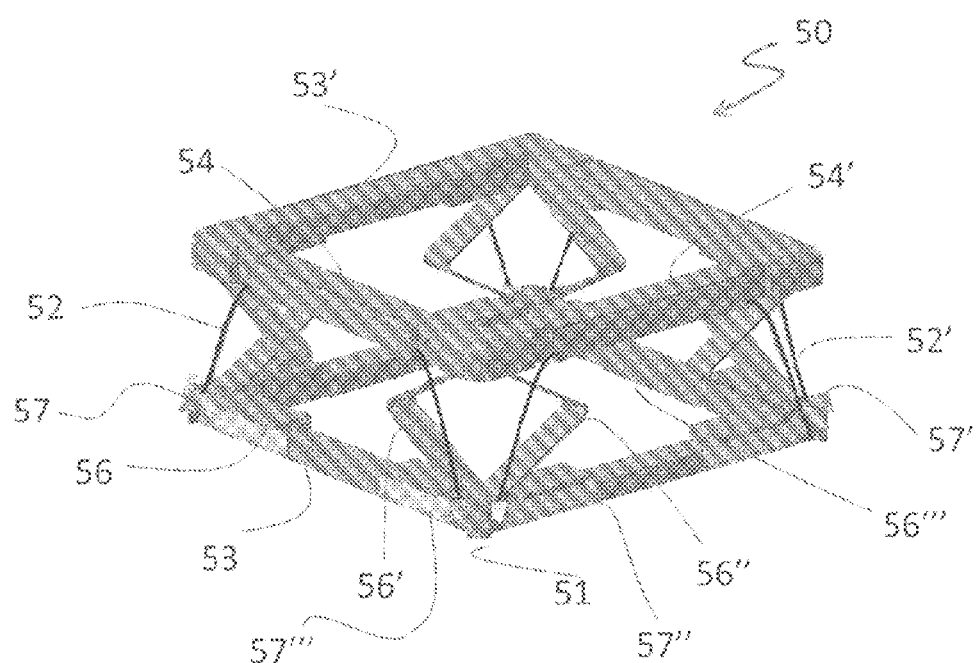
Figure 8:
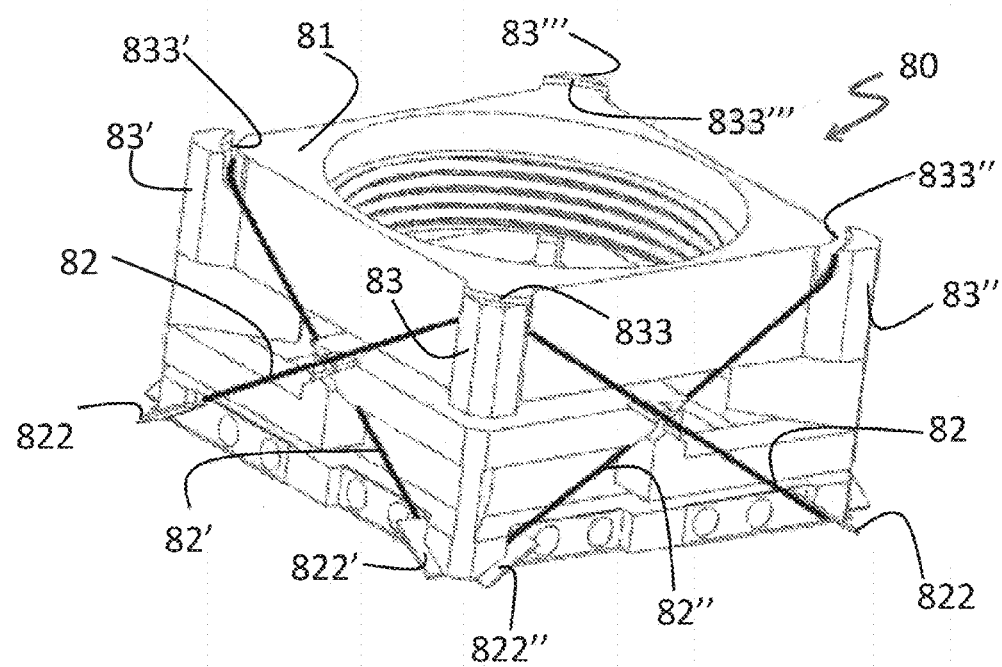

The invention will be further illustrated by means of the following figures where:

FIGS. 1 and 2 are perspective views respectively of a tilt module subassembly and of its cage according to the present invention, FIG. 3 is a perspective view of a second embodiment of a tilt module subassembly according to the present invention, FIG. 4 is a cross-sectional view of the tilt module subassembly of FIG. 3, FIGS. 5a and 5b are cross-sectional views of a third embodiment of a tilt module subassembly according to the present invention, FIGS. 6a and 6b are two photos of a tilt module subassembly according to a fourth embodiment of the present invention, FIG. 7 shows a perspective view of a tilt module subassembly according to a fifth embodiment of the present invention, and FIG. 8 shows a perspective view of a tilt module subassembly according to a sixth embodiment of the present invention.

In the above figures, dimensions and dimensional ratios may not be correct but in some cases have been altered in order to improve the figure readability; also, elements not essential for the understanding of the invention, such as for example shape memory alloys wires connections and fixings, usually have not been depicted since ancillary and widely known in the technical field.

For the purpose of the present invention, the term "cage" indicates the skeleton structure of the subassembly without any further element, such as the shape memory alloy wires.

FIG. 1 shows a perspective view of a tilt module 10 according to the present invention, comprising a cage 11 made of an elastic material having a Young modulus comprised between 13000 and 16000 MPa. In this embodiment cage 11 presents four protrusions, only two protrusions 13, 13' being visible in the perspective view, the purpose of which is to provide a hook point for each of the four shape memory wires used in the represented embodiment, only two SMA wires 12, 12' being visible in the perspective view. These hook points represent also the points where the shape memory alloy wires exert their contraction force, upon activation by Joule effect.

The elastic deformation of the cage structure 11 ensures the tilt of a contained camera module 14, and at the same time provides the return force for the SMA wire once it is deactivated.

It can be appreciated that the cage deformation provides a decoupling of the opposing and adjacent SMA wires, so that upon activation of one of them, the others are not subjected to a strain, or possibly only to a minimal one, since the strain is to a great extent absorbed by the elastic cage structure itself.

FIGS. 1 and 2 represent a first preferred embodiment for a tilt module subassembly according to the present invention, in which the cage has a structure consisting of two parallel squares 15, 15', spaced by four straight pillars 16, 16', 16", 16''' connecting the corresponding corners of said two parallel squares.

The main difference between FIGS. 1 and 2 is the absence of the camera module 14 and shape memory alloy wires 12, 12' in the latter, that allows for a better appreciation of the cage structure per se.

FIG. 3 shows a perspective view of a second embodiment of a tilt module subassembly 20 according to the present invention. Also in this case on elastic cage 21 there are shown only two protrusions 23, 23' of the four protrusions present, and two SMA wires 22, 22' of the four SMA wires present on the tilt module subassembly.

FIG. 4 shows its cross-sectional view with in evidence backbones 26 and 26', whose purpose is to confer structural integrity and at the same time ensure its flexibility once subjected to the forces exerted by one or more SMA wires.

The second embodiment of FIGS. 3 and 4 uses eight curved backbones such as 26 and 26' connected in pairs, each backbone connecting two adjacent corners of the upper or lower squares of the cage.

FIG. 5a shows a cross-sectional view of a further variant of this embodiment. In this case the eight backbones connect the upper and lower squares at the same corner of the tilt module cage, only two of them 36 and 36' being visible in cross-sectional view 30. In the represented third embodiment there are also shown two shape memory alloy wires 32 and 32', connecting corresponding sides of the upper and lower squares of the tilt module cage. In FIG. 5a there is also shown a return compression spring 37, secured to the upper square, providing further aid for the elastic cage shape recovery after the SMA wire deactivation.

FIG. 5b shows, in a cross-sectional view, the effect of the activation of shape memory alloy wire 32' on the tilt module subassembly. As it is possible to observe from this figure, tilting is achieved by the cage deformation due to shortening of the shape memory alloy wire 32', while the opposed shape memory alloy wire 32 does not alter its length and is unaffected by operations of the first shape memory alloy wire 32'.

FIGS. 6a, 6b show a side by side comparison of two front views of a fourth subassembly tilt module: subassembly 40 represents the case when the shape memory alloy wire 42 is shorter (actuated), whereas subassembly 40' when the shape memory alloy wire 42 is longer (not actuated). Only one wire 42 has been highlighted, but the system uses four wires and their simultaneous control achieves the precise and controlled tilting of the subassembly module. Note that in this case, unlike in the previous embodiments, the activation of the SMA wire(s) 42 moves the upper square away from the lower square by pulling closer and thus extending the backbones with an outwards V-shape that connect the two squares (i.e. the opposite of FIGS. 5a, 5b).

FIG. 7 shows a perspective view of a fifth embodiment of a tilt module 50 made according to the present invention. The elastic cage 51 structure is basically made by two parallel squares 53, 53' connected by eight backbone elements 56, 56', 56", 56''', . . . (only the most visible four clearly indicated), four shape memory alloy wires, 52, 52', . . . (only the most visible two clearly indicated), each having a portion placed within a guide 54, 54' (only the most visible two clearly indicated) where the wire guide is attached to the square 53' that does not have the shape memory alloy wire crimping elements, i.e. the guides have a similar purpose and effect like protrusions 23, 23' of FIGS. 3 and 4, but with the advantage in this case of providing a more distributed deformation effect onto the cage structure.

The guide 54' protects and guides a non-activated shape memory alloy wire, such as 52' from being displaced when a shape memory alloy wire is activated on an opposite or perpendicular side of the upper square 53'. The complete tilt module is designed to be a single molded part with overmolded metal latches 57, 57', 57", 57''', to crimp the shape memory alloy wires, such as 52', for mechanical and electrical attachment and connection.

FIG. 8 shows a perspective view of a tilt module subassembly 80 according to a sixth embodiment of the present invention. In this case the elastic cage 81 has, on its upper corners, four guides 833, 833', 833", 833''' obtained by having pillars 83, 83', 83", 83''' spaced apart from the elastic cage body. Each guide 833, 833', 833", 833''' has the purpose of lodging the central/middle portion of a shape memory alloy wire.

In particular, the tilt module subassembly 80 envisions the use of four shape memory alloy wires, only one of them, element 82, being fully visible in the perspective view of FIG. 8, while only half portions 82' and 82" are visible for other two of said shape memory alloy wires. Correspondingly, four pairs of restraining elements are present on the lower portion of the elastic cage 81, where the extremities of the shape memory alloy wires are firmly held, in the specific case of this embodiment by crimping. Only both restraining elements 822 of the shape memory alloy wire 82 are visible in FIG. 8, together with a single element of the pair for restraining elements 822' and 822".

So each shape memory alloy wire 82, 82' . . . has its extremities anchored to the elastic cage 81 by means of two restraining elements 822, 822' . . . placed on opposite corners of the elastic cage 81, and its central portion exerts its force on the elastic cage 81 via the guide 833, 833' . . . formed on the upper corner located between its restraining elements. The height difference between the position of the restraining elements 822, 822' . . . and the position of the shape memory alloy wire guide 833, 833' . . . allows the shape memory alloy wire to exert its compressive force once activated via heating (current passage).

A minor variant of the above embodiment envisions the use of four restraining elements, each firmly holding the terminal parts of two adjacent shape memory alloy wires.

Another variant of the above embodiments envisions the use of indentations in the upper surface of the elastic cage to create the guides for the central portions of the shape memory alloy wires.

The tilt module subassemblies according to the present invention are not restricted to the use of a specific type of shape memory alloy wires, but any shape memory alloy wires activated by Joule effect may be usefully employed. Having said that, preferred is the use of shape memory alloy wires made with Ni—Ti alloys widely known in the field with the name of Nitinol, with diameters ranging from 10 μm to 50 μm and commercially available from a variety of sources, for examples the wires sold under the trade name Smartflex by SAES Getters S.p.A., of particular preference is the use of 25 μm wires.

The material or materials for the cage structure of a tilt module subassembly according to the present invention are not restricted or limited to a specific class, they could be metals, plastics, composites, the only requirement being that they have a Young modulus comprised between 13000 and 16000 MPa, preferably between 14000 and 15000 MPa.

Notwithstanding the above, preferred materials for the cage structure are fiber-reinforced liquid crystal polymers.

The tilt module subassembly according to the present invention may be used in a variety of applications even though among the most interesting there is the use for Optical Image Stabilizers in cell phones camera modules. In view of this, in a second aspect thereof, the invention is inherent to an optical positioning system for consumer electronics or medical devices using micro structures. A preferred application is for the Optical Image Stabilizer (OIS) system.

The optical positioning system according to the present invention comprises a cage consisting essentially of elastic material and a plurality of shape memory alloy wires, wherein said elastic material has a Young modulus comprised between 13000 and 16000 MPa, preferably between 14000 and 15000 MPa. Additionally, the system applies to any optical positioning of micro mirrors to displace the optical path of light for consumer electronics and medical devices where micro structures need to be used.

Preferably the OIS system comprises also an Auto-Focus (AF) module, and/or a gyroscope.

The tilt module subassembly of the present invention is easier to make and presents improved performances by exploiting the inventive concept of having the whole (flexible) structure acting in and as counterbalance to the SMA wires, instead of having dedicated components, such as return springs, that provide a localized force whose impact and detrimental effect are lessened, but not eliminated, by the use of additional elements such as sliding spheres. It is important to underline, once again, that such dedicated counterbalance components are absent in a subassembly tilt module according to the present invention, as it is the structure itself providing such function, thanks to the novel and inventive feature (Young modulus in the claimed range) of the used material.

The invention claimed is:

1. A tilt module subassembly comprising a cage consisting essentially of elastic material, said cage having a structure formed by two parallel squares spaced by at least four spacing elements, and a plurality of shape memory alloy wires as actuating members acting on said structure of said cage, the plurality of shape memory alloy wires configured to exert contraction on at least one of the two parallel squares, wherein said elastic material has a Young modulus comprised between 13000 and 16000 MPa.

2. The tilt module subassembly according to claim 1, wherein said shape memory alloy wires are disposed symmetrically with respect to a cage symmetry axis.

3. The tilt module subassembly according to claim 1, wherein the number of shape memory alloy wires is four.

4. The tilt module subassembly according to claim 3, wherein the cage has a square shape and on each of the four corners of the cage there is a guide for respectively lodging the central portion of each one of the four shape memory alloy wires.

5. The tilt module subassembly according to claim 4, wherein said guides are formed by a spacing between the cage and four pillars, each of said pillars being placed on one of the four corners of the elastic cage.

6. The tilt module subassembly according to claim 4, wherein said guides are formed by indentations in the four corners of the cage.

7. The tilt module subassembly according to claim 4, wherein each shape memory alloy wire is anchored to the cage structure by means of restraining elements placed on opposing corners, where such restraining elements are at the same height.

8. The tilt module subassembly according to claim 7, wherein the number of said restraining elements is four or eight.

9. The tilt module subassembly according to claim 1, wherein said cage has a structure consisting of two parallel squares spaced by four pillars connecting the corresponding corners of said two parallel squares.

10. The tilt module subassembly according to claim 9, wherein on at least one side of a square there is a protrusion in the central portion of the square side for hooking and restraining a shape memory alloy wire.

11. The tilt module subassembly according to claim 1, wherein said cage has a structure given by two parallel squares spaced by eight angled backbones.

12. The tilt module subassembly according to claim 11, wherein each backbone connects two adjacent corners of a same square.

13. The tilt module subassembly according to claim 12, wherein on at least one side of a square there is a protrusion in the central portion of the square side for hooking and restraining a shape memory alloy wire.

14. The tilt module subassembly according to claim 11, wherein each backbone connects corresponding corners of the two squares.

15. The tilt module subassembly according to claim 14, wherein on at least one side of a square there is a linear guide for the shape memory alloy wire.

16. The tilt module subassembly according to claim 14, wherein each of the shape memory alloy wires connects adjacent backbones.

17. An optical image positioning system comprising the tilt module subassembly of claim 1.

18. The optical image positioning system of claim 17, wherein said optical image positioning system is an Optical Image Stabilizer (OIS).

19. The Optical Image Stabilizer (OIS) system of claim 18, further comprising an Auto-Focus (AF) module.

20. The Optical Image Stabilizer (OIS) system of claim 19, further comprising a gyroscope.

21. The tilt module subassembly according to claim 1, wherein the elastic material of the cage has a Young modulus comprised between 14000 and 15000 MPa.

* * * * *